(12) United States Patent
Talwar et al.

(10) Patent No.: US 12,233,797 B2
(45) Date of Patent: Feb. 25, 2025

(54) SYSTEM AND METHOD FOR A VOICE-ACTIVATED USER SUPPORT SYSTEM

(71) Applicant: GM GLOBAL TECHNOLOGY OPERATIONS LLC, Detroit, MI (US)

(72) Inventors: Gaurav Talwar, Novi, MI (US); Alaa M. Khamis, Courtice (CA); Xu Fang Zhao, LaSalle (CA); Kenneth R. Booker, Grosse Pointe Woods, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 271 days.

(21) Appl. No.: 17/946,477

(22) Filed: Sep. 16, 2022

(65) Prior Publication Data
US 2024/0092292 A1 Mar. 21, 2024

(51) Int. Cl.
*B60R 16/037* (2006.01)
*G10L 15/22* (2006.01)
*G10L 25/63* (2013.01)

(52) U.S. Cl.
CPC .......... *B60R 16/0373* (2013.01); *G10L 15/22* (2013.01); *G10L 25/63* (2013.01); *G10L 2015/223* (2013.01); *G10L 2015/225* (2013.01)

(58) Field of Classification Search
None
See application file for complete search history.

(56) References Cited

U.S. PATENT DOCUMENTS

| | | | |
|---|---|---|---|
| 11,425,215 B1* | 8/2022 | Lewis | G06F 9/4881 |
| 11,501,794 B1* | 11/2022 | Kim | G10L 15/1815 |
| 2019/0172453 A1* | 6/2019 | Zhao | G10L 15/22 |
| 2021/0082416 A1 | 3/2021 | Talwar et al. | |
| 2021/0375272 A1* | 12/2021 | Madwed | G06F 3/167 |

* cited by examiner

*Primary Examiner* — Stella L. Woo
(74) *Attorney, Agent, or Firm* — Quinn IP Law (57) ABSTRACT

The concepts include a user support system in the form of a microphone, a visual display arranged in a vehicle cabin, and a controller. The controller includes an instruction set that is executable to receive, via the microphone, a voice-based request from a user, and employ a virtual assistant to determine a user interaction in real time and to determine a specific intent for the voice-based request, including capturing metadata. A user interaction routine determines a user interaction parameter associated with the virtual assistant based upon the voice-based request from the user. A user sentiment analysis routine determines a user satisfaction parameter associated with the virtual assistant based upon the voice-based request from the user. The controller responds in real-time to the voice-based request based upon the user satisfaction parameter and the user interaction parameter that are associated with the virtual assistant.

16 Claims, 4 Drawing Sheets

SYSTEM AND METHOD FOR A VOICE-ACTIVATED USER SUPPORT SYSTEM

INTRODUCTION

Vehicles, smart phones, computers, and other systems employ voice-activated assistants to interact with users to respond to user queries.

SUMMARY

The concepts described herein include elements that may be composed as a system, a method, and/or an apparatus that are arranged and configured to provide a voice-activated user support system for responding to user queries, wherein the voice-activated user support system employs a virtual assistant in conjunction with a second assistant to respond to a user query, with a seamless transition between the virtual assistant and the second assistant.

An aspect of the disclosure may include a user support system that includes a microphone, a visual display arranged in a vehicle cabin, and a controller, wherein the controller is in communication with the microphone and the visual display. The controller includes an instruction set that is executable to receive, via the microphone, a voice-based request from a user, and employ a virtual assistant to determine a user interaction in real time and to determine a specific intent for the voice-based request, including capturing metadata. A user interaction routine determines a user interaction parameter associated with the virtual assistant based upon the voice-based request from the user. A user sentiment analysis routine determines a user satisfaction parameter associated with the virtual assistant based upon the voice-based request from the user. The controller responds in real-time to the voice-based request based upon the user satisfaction parameter and the user interaction parameter that are associated with the virtual assistant.

Another aspect of the disclosure may include the controller being arranged to respond in real-time to the voice-based request based upon the user satisfaction parameter and the user interaction parameter comprises the controller arranged to transfer the voice-based request from the user to a second assistant based upon the user satisfaction parameter and the user interaction parameter.

Another aspect of the disclosure may include the second assistant being a live advisor, and wherein the controller is arranged to transfer the voice-based request from the user to the live advisor in real-time based upon the user satisfaction parameter and the user interaction parameter.

Another aspect of the disclosure may include transferring the voice-based request from the user to the live advisor in real-time when either the user satisfaction parameter is less than a first threshold or the user interaction parameter is less than a second threshold.

Another aspect of the disclosure may include the user interaction parameter being determined based upon at least one of a quantity of dialogue iterations, a system latency time, and recognition of a domain to determine the specific intent for the voice-based request; wherein the user interaction parameter is inversely related to the quantity of dialogue iterations, the system latency time, and an inability to recognize of the domain.

Another aspect of the disclosure may include the user satisfaction parameter with the virtual assistant being a voice emotion recognition parameter.

Another aspect of the disclosure may include the second assistant being a second virtual advisor, and wherein the controller is arranged to transfer the voice-based request from the user to the second virtual advisor in real-time based upon the user satisfaction parameter and the user interaction with the virtual assistant.

Another aspect of the disclosure may include transferring the metadata acquired by the virtual assistant that is associated with the voice-based request to the second assistant.

Another aspect of the disclosure may include the virtual assistant including executable code to handle user assistance requests for navigation, cellular phone operation, and multimedia operation.

Another aspect of the disclosure may include a camera arranged to monitor the user and in communication with the controller; wherein the controller includes an instruction set, the instruction set executable to receive, via the camera, user image data; determine, via the user sentiment analysis routine, the user satisfaction parameter associated with the virtual assistant based upon the voice-based request from the user and the user image data; and respond in real-time to the voice-based request based upon the user satisfaction parameter and the user interaction parameter associated with the virtual assistant.

Another aspect of the disclosure may include the virtual assistant employing a Named Entity Recognition (NER)-based user behavior analysis to interact with the user in real time to determine the specific intent for the voice-based request.

Another aspect of the disclosure may include the instruction set being executable to determine a domain associated with the voice-based request; wherein the controller is arranged to disengage from the voice-based request from the user when the domain associated with the voice-based request is not recognized.

Another aspect of the disclosure may include a method for user support in a vehicle, which includes receiving, via a microphone, a voice-based request from a user; employing a virtual assistant to determine a user interaction in real time and to determine a specific intent for the voice-based request, including capturing metadata; determining a user interaction parameter associated with the virtual assistant based upon the voice-based request from the user; determine a user satisfaction parameter associated with the virtual assistant based upon the voice-based request from the user; and responding in real-time to the voice-based request based upon the user satisfaction parameter and the user interaction parameter associated with the virtual assistant.

The above summary is not intended to represent every possible embodiment or every aspect of the present disclosure. Rather, the foregoing summary is intended to exemplify some of the novel aspects and features disclosed herein. The above features and advantages, and other features and advantages of the present disclosure, will be readily apparent from the following detailed description of representative embodiments and modes for carrying out the present disclosure when taken in connection with the accompanying drawings and the claims.

BRIEF DESCRIPTION OF THE DRAWINGS

One or more embodiments will now be described, by way of example, with reference to the accompanying drawings, in which.

The appended drawings are not necessarily to scale, and may present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail in order to avoid unnecessarily obscuring the disclosure.

Furthermore, directional terms such as top, bottom, left, right, up, over, above, below, beneath, rear, and front, may be used when referring to the drawings. These and similar directional terms are not to be construed to limit the scope of the disclosure. Furthermore, the disclosure, as illustrated and described herein, may be practiced in the absence of an element that is not specifically disclosed herein.

The following detailed description is merely exemplary in nature and is not intended to limit the application and uses. Furthermore, there is no intention to be bound by any expressed or implied theory presented herein. Throughout the drawings, corresponding reference numerals indicate like or corresponding parts and features.

As employed herein, the term "system" may refer to one of or a combination of mechanical and electrical actuators, sensors, controllers, application-specific integrated circuits (ASIC), combinatorial logic circuits, software, firmware, and/or other components that are arranged to provide the described functionality.

As employed herein, the term "operatively connected" indicates a relationship in which one element operates or otherwise controls actuation of another element employing one or a combination of mechanical, fluidic electrical, electronic, magnetic, digital, etc., forces to perform one or multiple tasks.

The use of ordinals such as first, second and third does not necessarily imply a ranked sense of order, but rather may distinguish between multiple instances of an act or structure.

Figure 1:
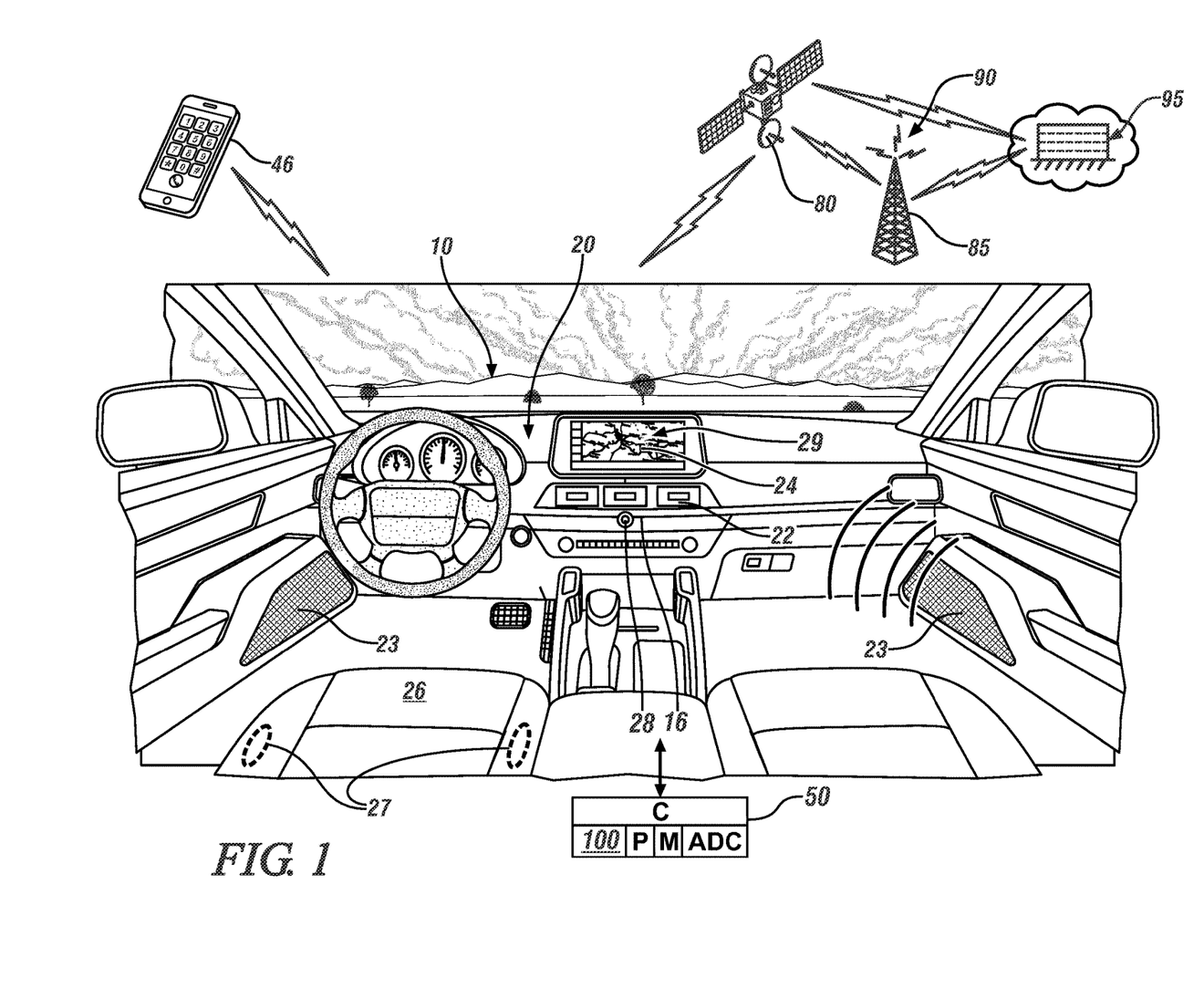
FIG. 1 pictorially illustrates an embodiment of a forward-facing portion of a passenger cabin for an embodiment of a vehicle, in accordance with the disclosure.

Referring to the drawings, wherein like reference numerals correspond to like or similar components throughout the several Figures, FIG. 1, consistent with embodiments disclosed herein, schematically illustrates elements of a passenger cabin 20 of a vehicle 10. The passenger cabin 20 includes a visual display system 24, a driver's seat 26, and a controller 50 having executable code in the form of an on-vehicle user support system 100, in one embodiment. Other elements may include, in one or more embodiments, an advanced driver assistance system (ADAS), a spatial monitoring system, a navigation system including a global positioning system (GPS) sensor, a human/machine interface (HMI) system 29, and a telematics system 16. A microphone 22 is arranged to monitor audible sound around the interior portion or cabin of the vehicle 10. An in-cabin camera 28 may be arranged to dynamically monitor the vehicle operator or another user of the HMI system 29. In one embodiment, the driver's seat 26 includes a plurality of haptic devices 27. A stereo audio system includes speakers 23. The visual display system 24 includes one or more of a driver information center, a head-up display, vehicle interior lighting, left and right sideview mirrors, a rear-view mirror, etc. The visual display system 24, microphone 22, and in-cabin camera 28 may be part of the HMI system 29 in one embodiment.

The vehicle 10 may include, but not be limited to a mobile platform in the form of a commercial vehicle, industrial vehicle, agricultural vehicle, passenger vehicle, aircraft, watercraft, train, all-terrain vehicle, personal movement apparatus, robot and the like to accomplish the purposes of this disclosure.

The HMI system 29 provides for human/machine interaction, for purposes of directing operation of an infotainment system, extra-vehicle communication, a navigation system, and the like, and includes a controller. The HMI system 29 monitors operator requests via operator interface device(s), and provides information to the operator including status of vehicle systems, service and maintenance information via the operator interface device(s).

The HMI system 29 communicates with and/or controls operation of one or a plurality of the operator interface devices, wherein the operator interface devices are capable of transmitting a message associated with operation of one of the autonomic vehicle control systems. The HMI system 29 may also communicate with one or more devices that monitor biometric data associated with the vehicle operator, including, e.g., eye gaze location, posture, and head position tracking, among others. The HMI system 29 is depicted as a unitary device for ease of description, but may be configured as a plurality of controllers and associated sensing devices in an embodiment of the system described herein. Operator interface devices can include devices that are capable of transmitting a message urging operator action, and can include an electronic visual display module, e.g., a liquid crystal display (LCD) device having touch-screen capability, a heads-up display (HUD), an audio feedback device, a wearable device, and a haptic seat such as the driver's seat 26 that includes the haptic devices 27. The operator interface devices that are capable of urging operator action are preferably controlled by or through the HMI system 29. The HUD may project information that is reflected onto an interior side of a windshield of the vehicle, in the field-of-view of the operator, including transmitting a confidence level associated with operating one of the autonomic vehicle control systems. The HUD may also provide augmented reality information, such as lane location, vehicle path, directional and/or navigational information, and the like.

The telematics system 16 includes a wireless telematics communication system capable of extra-vehicle communication, including communicating with a wireless communication network 90 having wireless and wired communication capabilities. The extra-vehicle communications may include short-range vehicle-to-vehicle (V2V) communication and/or vehicle-to-everything (V2x) communication, which may include communication with an infrastructure monitor, e.g., a traffic camera. Alternatively or in addition, the telematics system 16 may include wireless telematics communication systems that are capable of short-range wireless communication to a handheld device 46, e.g., a cell phone, a satellite phone or another telephonic device. In one embodiment the handheld device 46 includes a software application that includes a wireless protocol to communicate with the telematics system 16, wherein the handheld device 46 executes the extra-vehicle communication, including communicating with an off-board server 95 via the wireless communication network 90. Alternatively, or in addition, the telematics system 16 may execute the extra-vehicle communication directly by communicating with the off-board server 95 via the wireless communication network.

The communication network 90 may include, by way of non-limiting examples, a satellite 80, an antenna 85, and/or another communication mode. In one embodiment, the off-board server 95 is cloud-based.

The term "controller" and related terms such as microcontroller, control unit, processor and similar terms refer to one or various combinations of Application Specific Integrated Circuit(s) (ASIC), Field-Programmable Gate Array (FPGA), electronic circuit(s), central processing unit(s), e.g., microprocessor(s) and associated non-transitory memory component(s) in the form of memory and storage devices (read only, programmable read only, random access, hard drive, etc.). The non-transitory memory component stores machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms, and similar terms mean controller-executable instruction sets including calibrations and look-up tables. Each controller executes control routine(s) to provide desired functions. Routines may be executed at regular intervals, for example each 100 microseconds during ongoing operation. Alternatively, routines may be executed in response to occurrence of a triggering event.

Communication between controllers, actuators and/or sensors may be accomplished using a direct wired point-to-point link, a networked communication bus link, a wireless link or another suitable communication link. Communication includes exchanging data signals in suitable form, including, for example, electrical signals via a conductive medium, electromagnetic signals via air, optical signals via optical waveguides, and the like. The data signals may include discrete, analog or digitized analog signals representing inputs from sensors, actuator commands, and communication between controllers.

The term "signal" refers to a physically discernible indicator that conveys information, and may be a suitable waveform (e.g., electrical, optical, magnetic, mechanical or electromagnetic), such as DC, AC, sinusoidal-wave, triangular-wave, square-wave, vibration, and the like, which is capable of traveling through a medium. A parameter is defined as a measurable quantity that represents a physical property of a device or other element that is discernible using one or more sensors and/or a physical model. A parameter can have a discrete value, e.g., either "1" or "0", or can be infinitely variable in value.

The terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine.

As illustrated with reference to FIGS. 2 through 5, concepts related to implementation of the on-vehicle user support system 100 on an embodiment of the vehicle 10 described with reference to FIG. 1 are described. The on-vehicle user support system 100 seamlessly employs one or more of a virtual assistant 110, a live advisor 172, a second virtual assistant 174, 176, and another response mechanism 178 to respond to a voice-based request from a user that is captured by the microphone 22. The on-vehicle user support system 100 includes information from the microphone 22, the visual display system 24, and in some configurations, the in-cabin camera 28, all of which are in communication with controller 50. The on-vehicle user support system 100 may be reduced to practice as one or a plurality of algorithms and calibrations that are implemented in the controller 50. The on-vehicle user support system 100 is executable to receive, via the microphone 22, a voice-based request from a user, and initially employ a virtual assistant 110 to respond to the voice-based request. The controller 50 captures and interprets the user interaction, including evaluating the user interaction in real time to determine a specific intent for the voice-based request. This includes capturing metadata for the user interaction. The specific intent for the voice-based request may be a request for navigation assistance to a point of interest, a request for a podcast or other entertainment, a request for a traffic report or a weather report, a request for activation or deactivation of a driver assistance system, a request to initiate a phone call, or another user request.

In addition to capturing the specific intent for the voice-based request, the on-vehicle user support system 100 is operable to determine, via a user interaction routine 200, first and second user interaction parameters 122, 124, respectively, associated with the virtual assistant 110 based upon the voice-based request from the user, and is also operable to determine, via a user sentiment analysis routine 300, a user satisfaction parameter 130 associated with the virtual assistant 110 based upon the voice-based request from the user, and in some embodiments, information from the in-cabin camera 28.

The on-vehicle user support system 100 is operable to respond in real-time to the voice-based request based upon the user satisfaction parameter 130 and the first and second user interaction parameters 122, 124 associated with the virtual assistant 110. This may include the on-vehicle user support system 100 being configured to transfer the voice-based request from the user to a second assistant when the user satisfaction parameter 130 and/or the first and second user interaction parameters 122, 124 are at undesirable levels.

Referring now FIGS. 2 through 5, the on-vehicle user support system 100 is illustrated as a collection of blocks in a logical flow graph, which represents a sequence of operations that can be implemented in hardware, software, or a combination thereof. In the context of software, the blocks represent computer instructions that, when executed by one or more processors, perform the recited operations. For convenience and clarity of illustration, the on-vehicle user support system 100 is described with reference to the vehicle 10 that is described with reference to FIG. 1.

Figure 2:
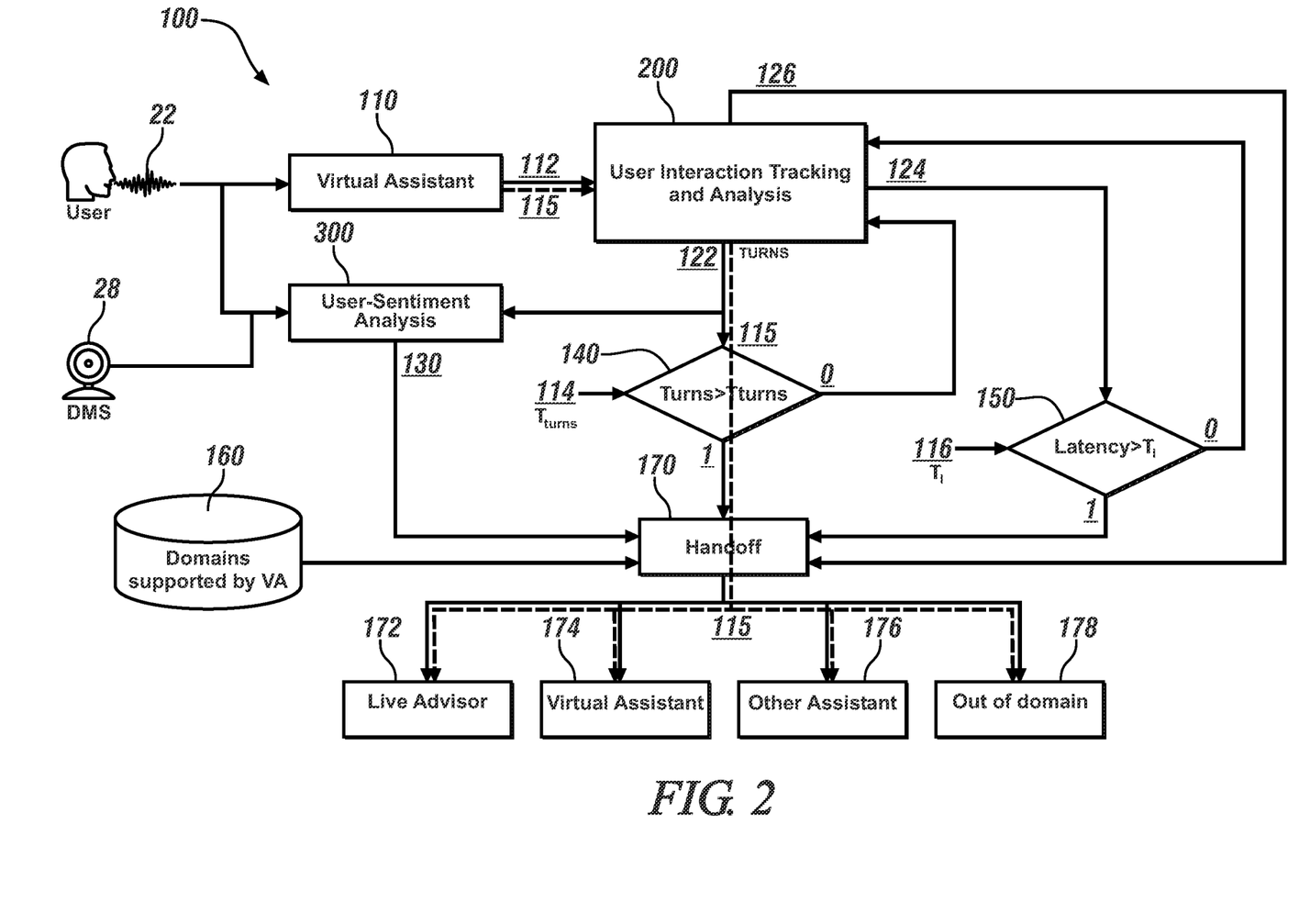
FIG. 2 schematically illustrates a flowchart depicting elements of an on-vehicle user support system, in accordance with the disclosure.

Referring now to FIG. 2, the on-vehicle user support system 100 includes the virtual assistant 110, the user interaction routine 200, a user sentiment analysis routine 300, and a handoff routine 170.

The on-vehicle user support system 100 receives, via the microphone 22, a voice-based request from a user, which is supplied to the virtual assistant 110 to respond to the voice-based request. The virtual assistant 110 may be in the form of an on-vehicle assistant, or may be a commercially available assistant such as Google, Alexa, Cortana, Siri, etc.

The virtual assistant 110 interacts with the user to interpret and classify the voice-based request, including querying the user for clarification of the voice-based request and comparing the information from the voice-based request to information from a database or another source. The virtual assistant 110 generates one or multiple digitized messages 112 in the form of recognized unstructured text, which is supplied to the user interaction routine 200.

The user interaction routine 200 captures and evaluates the digitized messages 112. The evaluation includes capturing the first interaction parameter 122 in the form of a quantity of dialogue iterations between the user and the virtual assistant 110, and capturing the second interaction parameter 124 in the form of a magnitude of latency between the occurrence of the voice-based request and presentation of a response from the virtual assistant 110. The first interaction parameter 122 and the second interaction parameter 124 may be other parameters that quantize interactions between the user and the virtual assistant 110.

The first interaction parameter 122 in the form of a quantity of dialogue iterations is conveyed to the user sentiment analysis routine 300.

The first interaction parameter 122 in the form of a quantity of dialogue iterations is compared to a maximum threshold 114 (Turns>Tturns) (140), and when the quantity of dialogue iterations exceeds the maximum threshold 114 (140)(1), the voice-based request is conveyed to the handoff routine 170, along with the metadata 115.

The second interaction parameter 124 in the form of the magnitude of latency is compared to a maximum latency threshold 116 (Latency>T1) (150), and when the magnitude of latency exceeds the maximum latency threshold 116 (150)(1), the voice-based request is conveyed to the handoff routine 170, along with the metadata 115.

Figure 3:
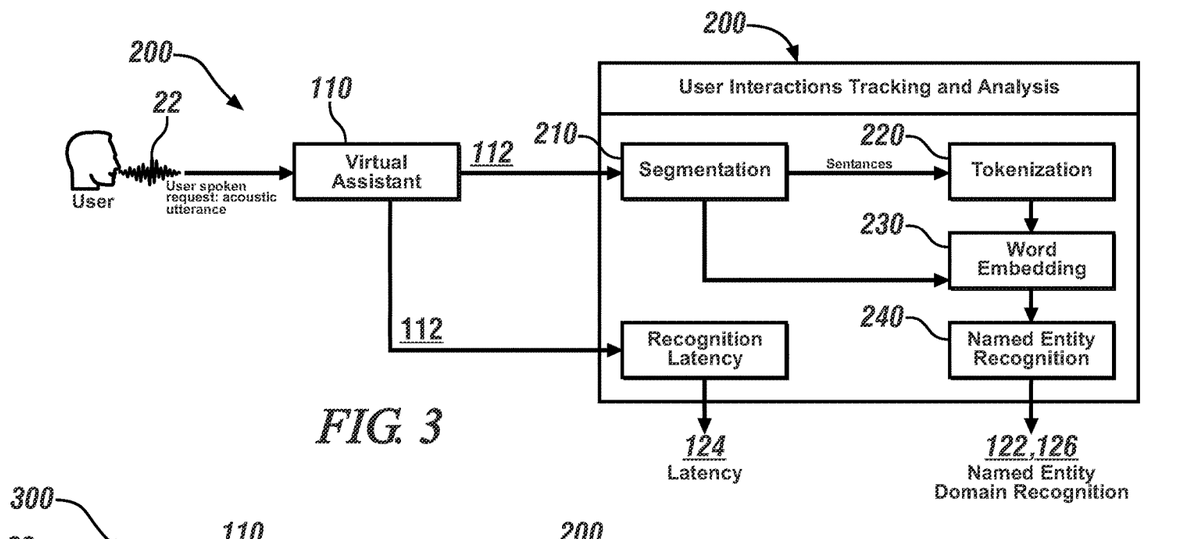
FIG. 3 schematically illustrates a flowchart depicting elements of an on-vehicle user support system, in accordance with the disclosure.

FIG. 3 schematically illustrates details related to the user interaction routine 200. The virtual assistant 110 generates one or multiple digitized messages 112 from the voice-based request via the microphone 22, in the form of recognized unstructured text, which is supplied to the user interaction routine 200. The user interaction routine 200 provides information for tracking the user interaction with the virtual assistant 110. The user interaction routine 200 segments the voice-based request into one or a plurality of sentences (210), tokenizes the sentences (220), and identifies embedded key words (230), from which it is able to employ a Named Entity Recognition (NER)-based user behavior analysis (240) to interact with the user in real time to determine the specific intent for the voice-based request. From this interaction, the user interaction routine 200 is able to determine the first interaction parameter 122 in the form of the quantity of dialogue iterations 122, i.e., query repetitions, and domain recognition 126. The domain recognition 126 indicates the domain to which the voice-based request belongs, e.g., entertainment, navigation, communication, etc., or none of the above. The virtual assistant 110 also determines the second interaction parameter 124 in the form of the recognition latency based upon the digitized messages 112 from the voice-based request via the microphone 22, which is an indication of the amount of time the user has been interacting with the virtual assistant 110 to achieve a result or desired outcome.

Figure 4:
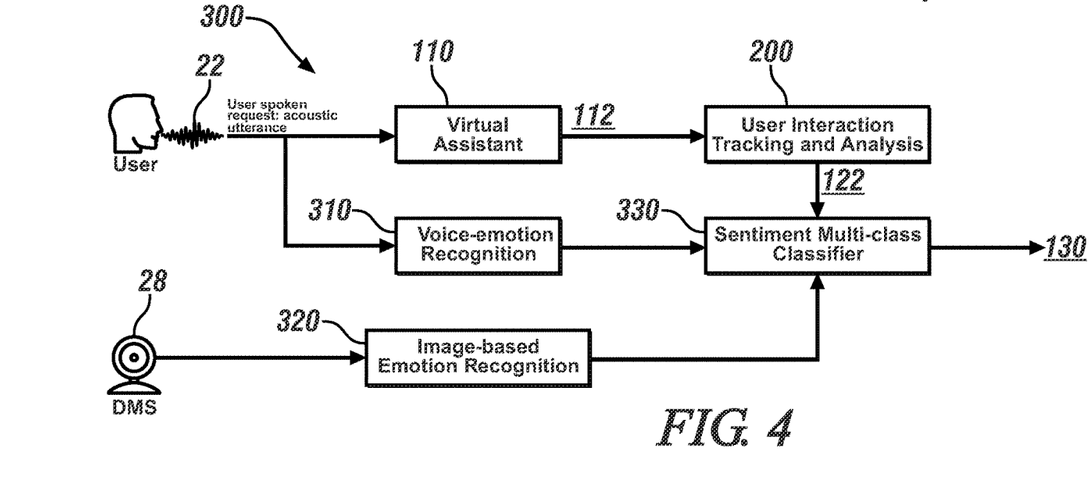
FIG. 4 schematically illustrates a flowchart depicting elements of an on-vehicle user support system, in accordance with the disclosure.

FIG. 4 schematically illustrates details related to the user sentiment analysis routine 300. The user sentiment analysis routine 300 monitors the voice-based request via the microphone 22, and in some embodiments, information from the in-cabin camera 28, and the first interaction parameter 122 in the form of the quantity of dialogue iterations 122 to determine the user satisfaction parameter 130. The user sentiment analysis routine 300 monitors the voice-based request via the microphone 22 to determine a voice emotion parameter 310.

The user sentiment analysis routine 300 monitors and evaluates the information from the in-cabin camera 28, including such indicators as frowns, smiles, head nods, etc., to determine an image-based emotion recognition parameter 320.

The voice emotion parameter 310 and the image-based emotion recognition parameter 320 are input to a sentiment classifier 330, which assigns the user satisfaction parameter 130 based thereon. In one embodiment, the user satisfaction parameter 130 may be a numeral between 1 and 5, wherein 1 represents the user appearing to be very satisfied, and 5 represents the user appearing to be very dissatisfied.

Referring again to FIG. 2, the first interaction parameter 122 in the form of the quantity of dialogue iterations 122, the second interaction parameter 124 in the form of the recognition latency, the domain recognition 126, and the user satisfaction parameter 130 are provided as inputs to the handoff routine 170, along with domain inputs from a virtual assistant database 160.

Figure 5:
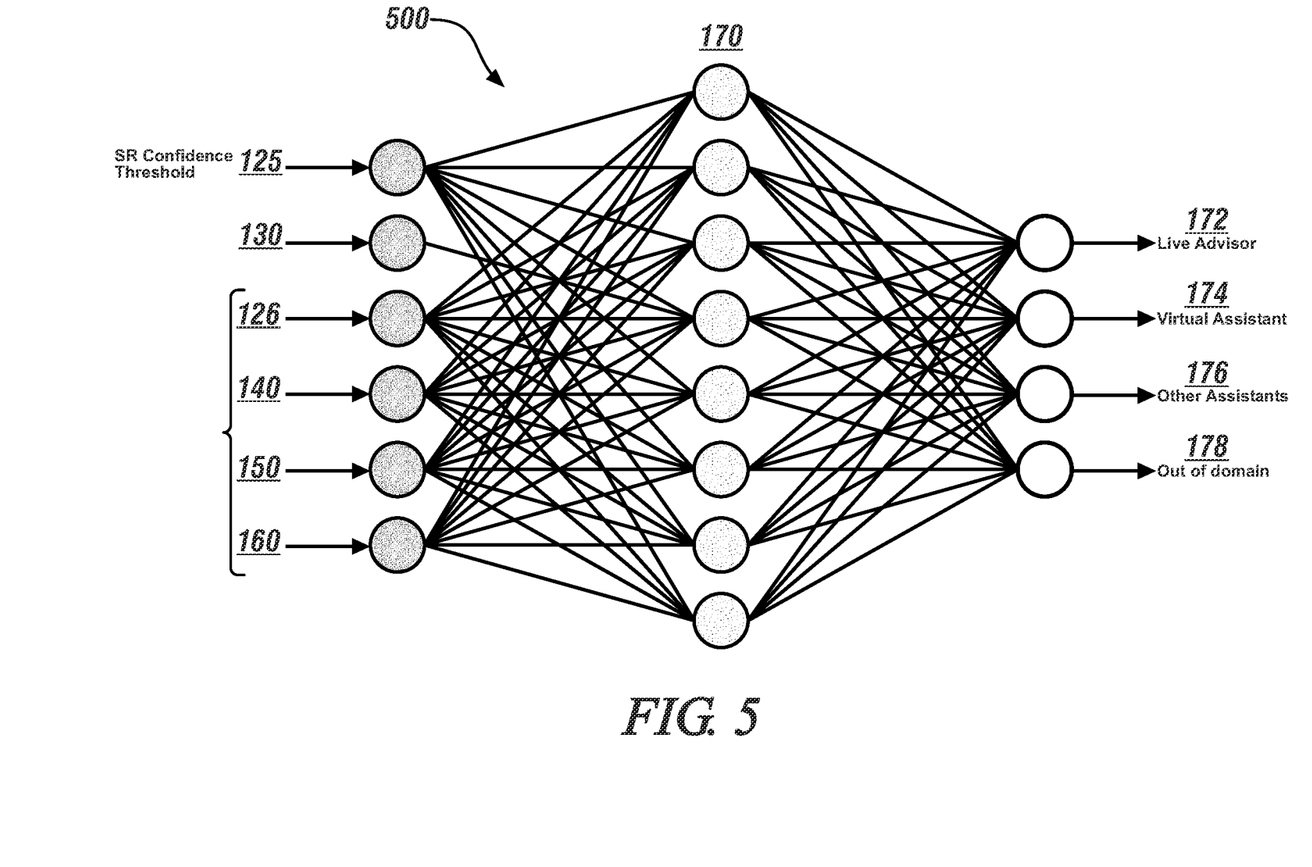
FIG. 5 schematically illustrates a flowchart depicting elements of an on-vehicle user support system, in accordance with the disclosure.

The handoff routine 170 is arranged as an arbitration module, in the form of a recursive neural network 500 or another artificial intelligence decision making system, as shown with reference to FIG. 5. The handoff routine 170 evaluates the foregoing information in context of a confidence threshold (SR Confidence threshold) 125, and decides a future course of action.

Referring again to FIG. 2, the future courses of action may include transferring the voice-based request to a live advisor 172, continuing to respond to the voice-based request via the virtual assistant 110 (174), transferring the voice-based request to a second virtual assistant (176), or another response mechanism 178 that may include politely disengaging from the voice-based request without a resolution.

The voice-based request may continue to be addressed by the virtual assistant 110 (174) when the domain recognition 126 indicates that the domain of operation of the voice-based request is within the purview of the system, but the first interaction parameter 122 in the form of the quantity of dialogue iterations, the second interaction parameter 124 in the form of the recognition latency, and/or the user satisfaction parameter 130 indicate that a resolution is forthcoming to fulfill or complete the voice-based request without interacting with the live advisor 172.

The voice-based request may be transferred to the live advisor 172 along with the metadata 115 when the domain recognition 126 indicates that the domain of operation of the voice-based request is within the purview of the system, but the first interaction parameter 122 in the form of the quantity of dialogue iterations 122, the second interaction parameter 124 in the form of the recognition latency, and/or the user satisfaction parameter 130 indicate a need for the user to interact with the live advisor 172 to fulfill or complete the voice-based request.

The voice-based request may be transferred to a second virtual assistant along with the metadata 115 (176) when the domain recognition 126 indicates that the domain of operation of the voice-based request is outside the purview of the system, and there is a second virtual assistant available to fulfill or complete the voice-based request.

The other response mechanism 178 includes having the system politely disengage from the voice-based request without resolution under certain circumstances, such as when the voice-based request is outside the purview of the system, and no second virtual assistant is available to fulfill or complete the voice-based request. This may occur when the voice-based request is incomprehensible, the domain of operation of the voice-based request includes engagement in illegal activities.

In this manner, the virtual assistant 110 and live advisor 172 are seamlessly linked together to provide smooth responses to voice-based requests. thus, when a user has difficulty communicating with a virtual assistant, the system will automatically switch to the live advisor 172 to continue the conversation. In addition, all metadata 115 acquired by virtual assistant will be transferred to the live advisor 172.

The flow charts of FIGS. 2 through 5 that detail the on-vehicle user support system 100 are executed as algorithmic code in the controller 50 employing executable instructions. The on-vehicle user support system 100 may be implemented through a computer algorithm, machine executable code, non-transitory computer-readable medium, or software instructions programmed into a suitable programmable logic device(s) of the vehicle, such as the one or more modules, the entertainment module, a server in communication with the vehicle computing system, a mobile device communicating with the vehicle computing system and/or server, other controller in the vehicle, or a combination thereof. Although the various steps shown in the flowchart diagram appear to occur in a chronological sequence, at least some of the steps may occur in a different order, and some steps may be performed concurrently or not at all.

The flowchart and block diagrams in the flow diagrams illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by dedicated-function hardware-based systems that perform the specified functions or acts, or combinations of dedicated-function hardware and computer instructions. These computer program instructions may also be stored in a computer-readable medium that can direct a computer or other programmable data processing apparatus to function in a particular manner, such that the instructions stored in the computer-readable medium produce an article of manufacture including instruction set that implements the function/act specified in the flowchart and/or block diagram block or blocks.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the claims.

What is claimed is:

1. A user support system for a vehicle, comprising:
   a microphone, and a visual display arranged in a vehicle cabin;
   a controller in communication with the microphone and the visual display;
   the controller including an instruction set, the instruction set being executable to:
   receive, via the microphone, a voice-based request from a user;
   employ a virtual assistant to determine a user interaction in real time and to determine a specific intent for the voice-based request, including capturing metadata;
   determine, via a user interaction routine, a user interaction parameter associated with the virtual assistant based upon the voice-based request from the user;
   determine, via a user sentiment analysis routine, a user satisfaction parameter associated with the virtual assistant based upon the voice-based request from the user, wherein the user interaction parameter is determined based upon a quantity of dialogue iterations, a system latency time, and a recognition of a domain to determine the specific intent for the voice-based request;
   respond in real-time to the voice-based request based upon the user satisfaction parameter and the user interaction parameter associated with the virtual assistant; and
   transfer the voice-based request from the user to a second assistant based upon the user satisfaction parameter and the user interaction parameter;
   wherein the second assistant comprises a live advisor, and wherein the controller is arranged to transfer the voice-based request from the user to the live advisor in real-time when either the user satisfaction parameter is less than a first threshold or the user interaction parameter is less than a second threshold; and
   wherein the user interaction parameter is inversely related to the quantity of dialogue iterations, the system latency time, and an inability to recognize the domain.

2. The system of claim 1, wherein the user satisfaction parameter with the virtual assistant comprises a voice emotion recognition parameter.

3. The system of claim 1, wherein the second assistant comprises a second virtual advisor, and wherein the controller is arranged to transfer the voice-based request from the user to the second virtual advisor in real-time based upon the user satisfaction parameter and the user interaction with the virtual assistant.

4. The system of claim 1, further comprising transferring the metadata acquired by the virtual assistant that is associated with the voice-based request to the second assistant.

5. The system of claim 1, wherein the virtual assistant includes executable code to handle user assistance requests for navigation, cellular phone operation, and multimedia operation.

6. The system of claim 1, further comprising a camera arranged to monitor the user and in communication with the controller;
   wherein the controller includes an instruction set, the instruction set being executable to:
   receive, via the camera, user image data;

determine, via the user sentiment analysis routine, the user satisfaction parameter associated with the virtual assistant based upon the voice-based request from the user and the user image data; and respond in real-time to the voice-based request based upon the user satisfaction parameter and the user interaction parameter associated with the virtual assistant.

7. The system of claim 1, wherein the virtual assistant employs a Named Entity Recognition (NER)-based user behavior analysis to interact with the user in real time to determine the specific intent for the voice-based request.

8. The system of claim 1, further comprising the instruction set being executable to determine the domain associated with the voice-based request; wherein the controller is arranged to disengage from the voice-based request from the user when the domain associated with the voice-based request is not recognized.

9. A method for user support in a vehicle, comprising:
receiving, via a microphone, a voice-based request from a user;
employing a virtual assistant to determine a user interaction in real time and to determine a specific intent for the voice-based request, including capturing metadata;
determining a user interaction parameter associated with the virtual assistant based upon the voice-based request from the user, wherein the user interaction parameter is determined based upon a quantity of dialogue iterations, a system latency time, and a recognition of a domain to determine the specific intent for the voice-based request;
determining a user satisfaction parameter associated with the virtual assistant based upon the voice-based request from the user; and
responding in real-time to the voice-based request based upon the user satisfaction parameter and the user interaction parameter associated with the virtual assistant; and
transferring the voice-based request from the user to a second assistant based upon the user satisfaction parameter and the user interaction parameter;
wherein the second assistant comprises a live advisor, and wherein the controller is arranged to transfer the voice-based request from the user to the live advisor in real-time when either the user satisfaction parameter is less than a first threshold or the user interaction parameter is less than a second threshold; and
wherein the user interaction parameter is inversely related to the quantity of dialogue iterations, the system latency time, and an inability to recognize the domain.

10. The method of claim 9, wherein the second assistant comprises a second virtual advisor;
the method further comprising transferring the voice-based request from the user to the second virtual advisor in real-time based upon the user satisfaction parameter and the user interaction with the virtual assistant.

11. The method of claim 9, wherein the user satisfaction parameter with the virtual assistant comprises a voice emotion recognition parameter.

12. The method of claim 9, further comprising:
receiving, via a camera, user image data;
determining the user satisfaction parameter associated with the virtual assistant based upon the voice-based request from the user and the user image data; and
responding in real-time to the voice-based request based upon the user satisfaction parameter and the user interaction parameter associated with the virtual assistant.

13. A method for user support in a vehicle, comprising:
receiving, via a microphone, a voice-based request from a user;
employing a virtual assistant to determine a user interaction in real time and to determine a specific intent for the voice-based request, including capturing metadata;
determining a user interaction parameter associated with the virtual assistant based upon the voice-based request from the user, wherein the user interaction parameter is determined based upon a recognition of a domain to determine the specific intent for the voice-based request;
determining a user satisfaction parameter associated with the virtual assistant based upon the voice-based request from the user; and
responding in real-time to the voice-based request based upon the user satisfaction parameter and the user interaction parameter associated with the virtual assistant; and
transferring the voice-based request from the user to a second assistant based upon the user satisfaction parameter and the user interaction parameter;
wherein the second assistant comprises a live advisor, and wherein the controller is arranged to transfer the voice-based request from the user to the live advisor in real-time when either the user satisfaction parameter is less than a first threshold or the user interaction parameter is less than a second threshold.

14. The method of claim 13, wherein the user interaction parameter is inversely related to an inability to recognize the domain.

15. The method of claim 13, further comprising determining the user interaction parameter associated with the virtual assistant based upon the voice-based request from the user, wherein the user interaction parameter is determined based upon a quantity of dialogue iterations, a system latency time, and the recognition of a domain to determine the specific intent for the voice-based request.

16. The method of claim 15, wherein the user interaction parameter is inversely related to the quantity of dialogue iterations, the system latency time, and an inability to recognize the domain.

* * * * *